US010710694B2

(12) United States Patent
Vincent et al.

(10) Patent No.: US 10,710,694 B2
(45) Date of Patent: Jul. 14, 2020

(54) DRIVE UNIT FOR MARINE VESSELS COMPRISED OF DRIVE SHAFT BRAKING AND LOCKING SYSTEM

(71) Applicant: AETC SAPPHIRE, Saint Petersburg (RU)

(72) Inventors: Loic Vincent, Belfort (FR); Thierry Deschamps, Belfort (FR); Laurent Barth, Belfort (FR); Lionel Julliand, Belfort (FR)

(73) Assignee: AETC SAPPHIRE, Saint Petersburg (RU)

( * ) Notice: Subject to any disclaimer, the term of this patent is extended or adjusted under 35 U.S.C. 154(b) by 0 days.

(21) Appl. No.: 16/324,348

(22) PCT Filed: Aug. 8, 2017

(86) PCT No.: PCT/EP2017/070038
§ 371 (c)(1),
(2) Date: Feb. 8, 2019

(87) PCT Pub. No.: WO2018/029180
PCT Pub. Date: Feb. 15, 2018

(65) Prior Publication Data
US 2019/0168856 A1 Jun. 6, 2019

(30) Foreign Application Priority Data

Aug. 9, 2016 (FR) ..................................... 16 57657

(51) Int. Cl.
B63H 23/35 (2006.01)
B63H 25/42 (2006.01)
(Continued)

(52) U.S. Cl.
CPC ............. *B63H 23/35* (2013.01); *B63H 5/125* (2013.01); *B63H 21/17* (2013.01); *B63H 25/42* (2013.01);
(Continued)

(58) Field of Classification Search
CPC ........ B63H 21/00; B63H 21/17; B63H 25/00; B63H 25/42; B63H 5/00; B63H 5/16;
(Continued)

(56) References Cited

U.S. PATENT DOCUMENTS 6,165,031 A * 12/2000 Lonngren ............ B63H 25/381
440/51
6,712,654 B1 * 3/2004 Putaansuu .............. B63H 5/125
440/53

(Continued)

FOREIGN PATENT DOCUMENTS

DE 19648417 A1 * 5/1998 ............... B63H 5/10
KR 20140022277 A * 2/2014 ............. B63H 23/35

*Primary Examiner* — Lars A Olson
(74) *Attorney, Agent, or Firm* — Christensen O'Connor Johnson Kindness PLLC

(57) ABSTRACT

The drive unit is designed to be mounted on a marine vessel, including a mobile housing, and is able to pivot around an axis against the hull of the marine vessel. A drive shaft mounted rotary is against the mobile housing and is supported by two roller bearings. A propulsion element rotates in solidarity with the drive shaft. The propulsion unit has, at the front, at least two braking and locking systems of the drive shaft located in an area between the upstream rolling bearing and propulsion element.

10 Claims, 2 Drawing Sheets

(51) Int. Cl.
*B63H 21/17* (2006.01)
*F16C 41/00* (2006.01)
*F16D 49/18* (2006.01)
*F16D 49/00* (2006.01)
*B63H 5/125* (2006.01)
*F16D 125/40* (2012.01)
*F16D 125/66* (2012.01)

(52) U.S. Cl.
CPC ............ *F16C 41/001* (2013.01); *F16D 49/00* (2013.01); *F16D 49/18* (2013.01); *B63H 2005/1256* (2013.01); *F16C 2326/30* (2013.01); *F16D 2125/40* (2013.01); *F16D 2125/66* (2013.01)

(58) Field of Classification Search
CPC ......... B63H 5/125; B63H 23/35; F16D 55/00; F16D 55/02; F16D 49/18; F16C 41/001
USPC ............................................... 440/53, 55, 51
See application file for complete search history.

(56) References Cited

U.S. PATENT DOCUMENTS

| | | | |
|---|---|---|---|
| 6,994,602 B2 * | 2/2006 | Ries | B63H 23/24 440/51 |
| 7,061,147 B2 * | 6/2006 | Ries | B63H 5/125 440/6 |
| 7,371,134 B2 * | 5/2008 | Winn | B63H 5/125 440/6 |

* cited by examiner

DRIVE UNIT FOR MARINE VESSELS COMPRISED OF DRIVE SHAFT BRAKING AND LOCKING SYSTEM

BACKGROUND OF THE DISCLOSURE

The proposed invention concerns the drive units of marine vessels such as ships or submarines, as well as oil platforms.

These drive units, also known as "propulsion oriented drive" or "POD", typically include a mobile housing mounted with a pivot link to a hull of a marine vessel. The hull element may be placed at the stern or prow of a ship.

Due to strong currents, the propeller of the ship's drive unit can inadvertently damage the drive shaft's roller bearing of the drive unit. Furthermore, in strong currents, it may be necessary to brake, or block, the drive shaft of the drive unit propeller.

Additionally, if one of the propulsion units fails, the drive shaft rotation of the failed drive unit must be blocked. This allows the ship to return to port using the working drive unit, preventing further damage to the defective drive unit.

Drive units used for ice-breaking have an additional axial dimension constraint, which means it is necessary for the system to provide both the braking and blocking of the drive shaft of a drive unit, without increasing its axial dimension.

BRIEF SUMMARY

A purpose of the invention is to offset the previously stated disadvantages and propose a braking and blocking system for the drive shaft of a marine vessel drive unit.

One objective of this invention is the drive unit that is designed to be mounted on a marine vessel. This includes a mobile housing that pivots around an axis from the hull of the marine vessel, a drive shaft mounted rotary against the mobile housing supported by two roller bearings, and a drive element that rotates in solidarity from the drive shaft.

At the front of the drive unit there are at least two braking and locking systems located between the upstream roller bearing and propulsion element. When the drive unit is immersed, the area between the upstream rolling bearing and propulsion element is filled with sea water. Braking and locking systems are placed within the drive unit and are immersed in this area. This helps avoid any risk of dust or the unit heating up when braking and/or locking the drive shaft.

The braking and locking system includes an actuator designed to control the friction of the brake pad lining on the disk brake rotating in solidarity with the drive shaft.

In the case of braking and/or locking of the drive shaft, the lining provides radial support on the outside cylindrical surface of the brake disc.

In the rest position, the brake pad is driven away radially from the brake disc by a spacing component, such as a spring.

According to one embodiment, the actuator includes a worm screw turned by a gear motor and provides a translation linear motion to an actuator arm with a braking component in contact with the brake pad.

For example, the inner surface of the braking component and the outer surface of the brake pad are inclined with respect to the axis of the actuator arm. In other words, the two contact surfaces are in shape concordance.

Both braking and locking systems can be identical and positioned symmetrically against the drive shaft.

According to another embodiment, the drive unit includes at least three braking and locking systems located more than 120° from each other around the drive shaft.

Having one or two braking and locking systems located below the drive shaft level around the propulsion shaft allows for radial support of the drive shaft in the event of disassembly of the upstream roller bearing. For example, disassembly may occur during maintenance in a dry dock.

The braking and locking system is located between the propulsion element and shaft bearing located on the side of the propeller. The braking system is under the mobile housing with the flow of sea water circulating around the drive unit while the marine vessel moves normally.

BRIEF DESCRIPTION OF THE DRAWINGS

Other purposes, characteristics, and advantages of the invention will be identified in the following description, given only as a non-limiting example, and related to the attached drawings on which.

DETAILED DESCRIPTION

In the following description, the terms "longitudinal", "transverse", "vertical", "front", "back", "left", and "right" are designated in relation to the common orthogonal benchmark of marine vessels represented in figures, including:

a. An X axis, perpendicular to the plane of FIG. 1 and oriented by the marine vessel pitch axis 2, while the marine vessel is disposed according to a normal operating plan. A "normal operating plane" contains longitudinal and transversal marine vessel directions while the latter evolves on a calm sea, under normal loading conditions.

b. A Y axis, horizontal relative to FIG. 1 and oriented by the marine vessel pitch axis, while the marine vessel is disposed according to a normal operating plan.

c. A Z axis, vertical relative to FIG. 1 and oriented by the marine vessel yaw axis, while the marine vessel is disposed according to a normal operating plan.

"Marine vessels" refers to ships, submarines, or oil platforms.

Figure 1:
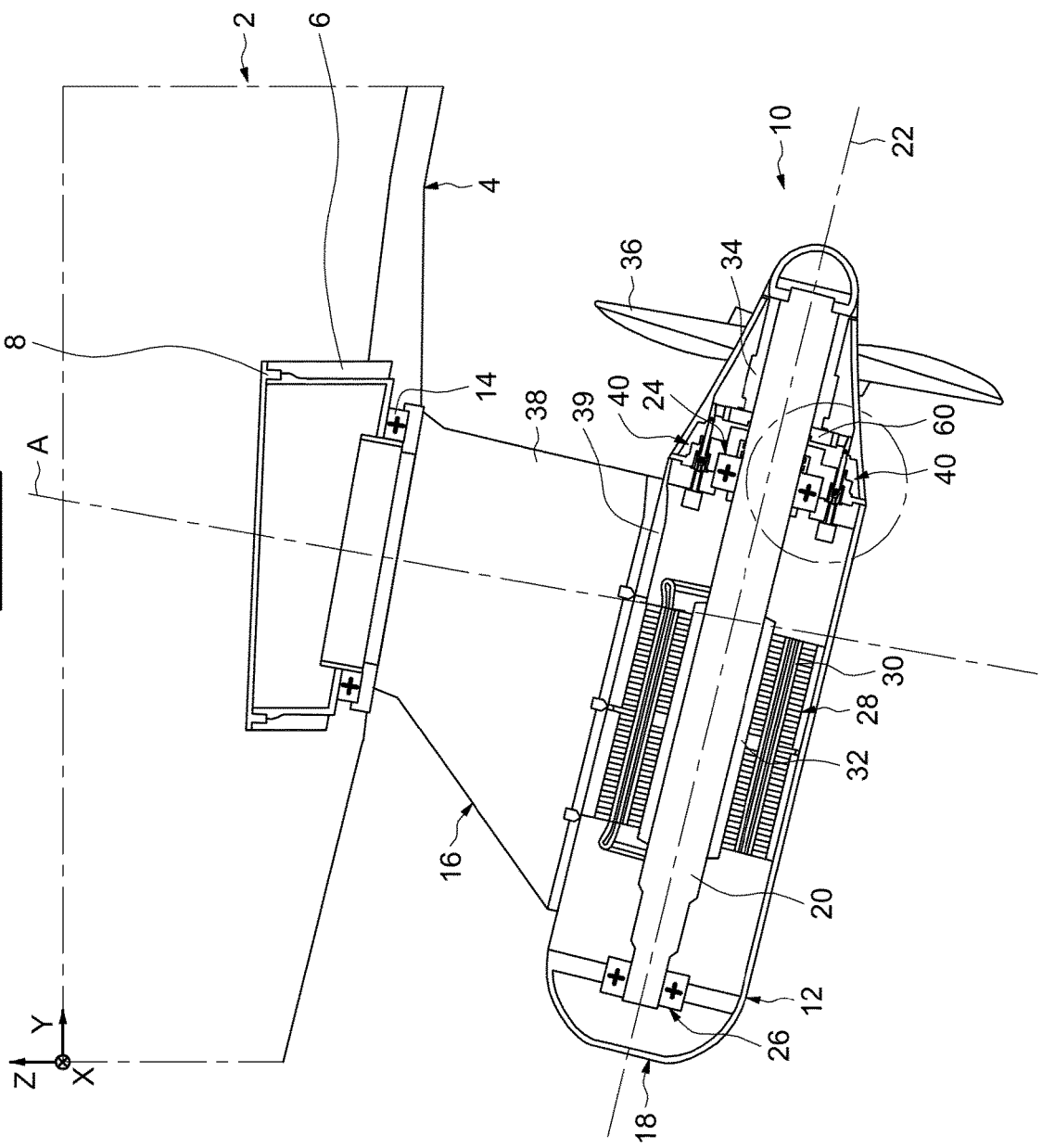
FIG. 1 is a cross-axial section of a power system according to an example of the invention embodiment.

As illustrated in FIG. 1, the ship 2 has a hull 4 that includes a through bore where a cylindrical seat 6 is mounted. The seat 6 is encased in the hull 4 through fixed means (not shown). For example, the seat 6 can be assembled with the hull 4 using bolts, welding points or seams, or by press fitting. The axis of the cylindrical seat 6 is parallel to the vertical direction defined relative to the ship 2 along the Z axis. The cylindrical seat 6 has a clamp 8 of annular or oval form, and is oriented perpendicularly to the axial direction of the seat 6.

The ship 2 represented in FIG. 1 has a power system 10 mounted on the hull 4. The power system 10 includes a drive unit 12 and one rudder bearing 14. The drive unit 12 protrudes outwardly from the hull 4. In other words, the drive unit 12 is located in the outer part of the hull 4 and is designed to be immersed. By means of the rudder bearing 14, the drive unit 12 includes a mobile housing 16 able to pivot around axis A, relative to the hull 4.

The mobile housing 16 has a lower part 18 shaped as an oblong cylindrical tube. Inside the lower part 18, a propeller drive shaft 20 is mounted so it can rotate in relation to the mobile housing 16. The drive shaft 20 can rotate around its own axis 22. To do this, the lower part 18 has two pivoting roller bearings 24, 26 oriented perpendicular to the direction of the propeller shaft 22 and links the lower part 18 with the drive shaft 20.

To generate rotation of the drive shaft 20 relative to the mobile housing 16, an electric engine 28 is located inside the lower part 18. The electric engine 28 includes a stator 30 mounted on the lower part 18 and a rotor 32 mounted on the drive shaft 20.

The drive shaft 20 rotates a propeller support 34 with a mounted propeller 36. Although, in the embodiment mode presented with reference to the figures, the drive unit 12 includes a propeller, but may also include, (within the invention framework) a different drive element, for example a pump rotor.

According to the illustrated embodiment, the propeller 36 is mounted on one end in front of the drive unit 12, from the marine vessel 2. The propeller 36 is therefore upstream from the mobile housing 16 in the water flow circling around the drive unit 12 while the marine vessel 2 moves normally.

In other terms, the propeller 36 works in traction. However, we can consider, within the framework of the invention, to place the propeller on the opposite end so that it works on thrust. This alternative is different from the illustrated example because the position is reversed, on the driven end of the drive unit, on which the propeller support 34 is mounted, and of the other non-driven-end of the shaft 20.

The mobile housing 16 has an upper part 38 mechanically connected to the lower part 18 near the proximal end 40. For example, the upper part 38 and lower part 18 can be assembled using bolts, weld points, and/or seams (not shown). The upper part 38 and lower part 18 can also be two parts of a single cast piece.

In the front part of the drive unit 12, it comprises two drive shaft 20 braking and locking systems 40. Braking and locking systems 40 can be identical between them and positioned symmetrically against the drive shaft 20. Alternatively, there may be three braking systems around the drive shaft 20 at over 120° from each other. Having one or two braking and locking systems 40 located below the drive shaft allows for radial support of the drive shaft in case of disassembly of the roller bearing 24 located in front of the drive unit 12.

Figure 2:
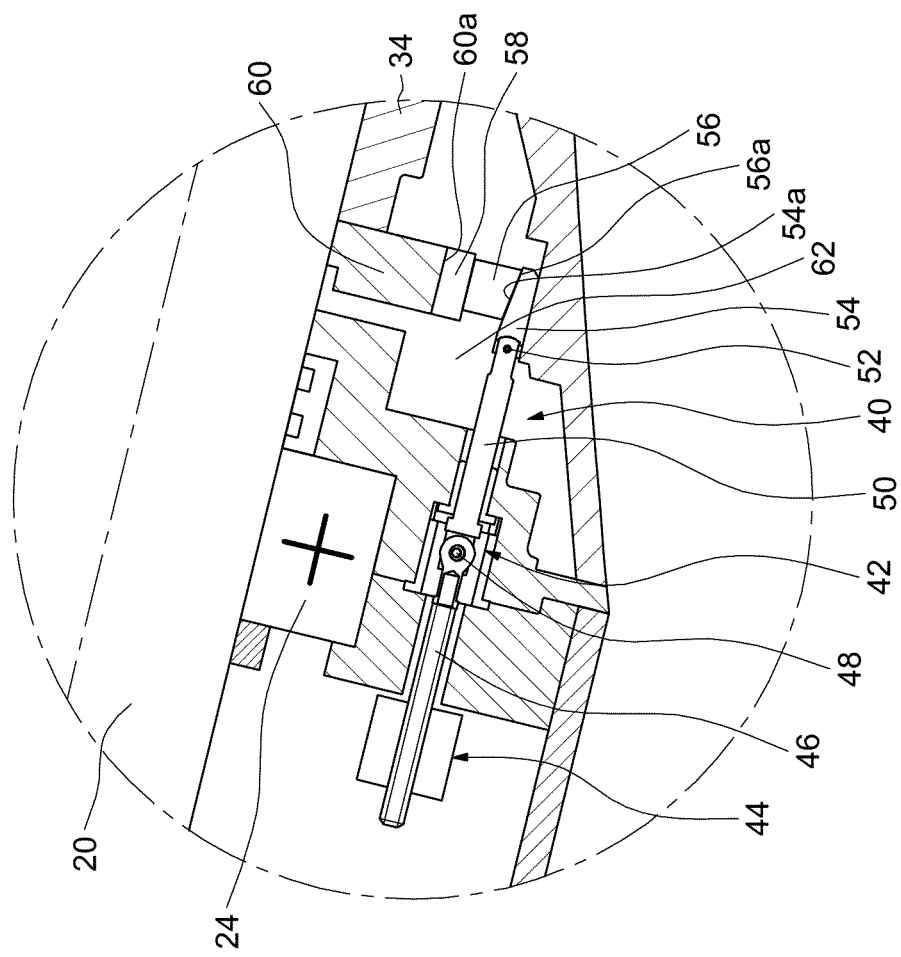
FIG. 2 is a detailed view of a braking system within the propulsion assembly in FIG. 1.

FIG. 2 shows one of the drive shaft 20 braking and locking systems 40 in detail. The braking and locking system 40 is arranged inside the drive unit 12 between the roller bearing 24 and propeller 36.

As shown, the braking and locking system 40 includes an actuator 42.

In the illustrated embodiment, and non-limiting example, the actuator 42 includes a worm screw system 46 turned by a gear motor 44 that transforms the rotation movement provided by the gear motor in a linear movement. The actuator 42 is provided, at one end, with a cam 48 to provide a linear motion of translation to an actuator arm 50. The end of the actuator arm 50, opposite to the cam 48, is connected by a joint 52 to a braking component 54 whose inner surface 54a is inclined to the axis of the actuator arm 50.

The brake component 54 rests on a brake pad 56 fitted with a brake lining 58 designed in radial support on the outer cylindrical surface 60a of a disc 60 rotating in solidarity with the drive shaft 20 and fixed on the propeller support 34. The lining 58 is made from friction material.

The outside surface 56a of the brake pad 56 is inclined to the axis of the actuator arm 50. In rest position, the brake pad 56 is driven away radially from the brake disc 60 by a spacing component (not shown).

When it becomes necessary to slow down the drive shaft 20, the braking and locking system 40 is operated to cause linear movement of the actuating arm 50. The braking component 54 slides on the outside tilted surface 56a of the brake pad 56 that moves radially towards the disc 60 with cooperation of the two angled surfaces 54a, 56a, of the brake component 54 and brake pad 56, respectively. The braking and locking system 40 generally causes friction of the lining 58 of the brake pad 56 on the brake disc 60 rotating in solidarity with the drive shaft 20. The surfaces 54a, 56a are made of friction limiting material, such as PTFE, bronze, stainless steel, or others.

"Actuator" refers to any mechanical system that transforms supplied energy into mechanical energy. The actuator can be electric or hydraulic. In general, the actuator operates the actuator arm to cause radial friction of the lining on the brake disc. There can also be axial friction of the lining on the brake disc.

The braking and locking system 40 is arranged in an area 62 filled with water. Thus, the friction of the lining 58 of the brake pad 56 on the brake disk 60 does not generate dust inside the drive unit 12. Furthermore, the braking and locking system 40 position in area 62 filled with sea water, between the upstream roller bearing 24 and propeller 36, does not generate heat when braking or locking the drive shaft.

The actuating arm 50 path is increased to completely lock the drive shaft 20.

Such braking and locking systems are suited for propulsion units used for ice-breaking, which requires a small footprint.

This invention is not confined to the specific structure of braking and locking systems. Instead, there can be any type of actuator in the drive unit between the upstream roller bearing 24 and the propeller, providing support on the drive shaft through a braking skid.

With this invention, the drive shaft can be radially stopped, blocked, and supported while avoiding dust formation when braking and blocking the drive shaft.

What we claim is:

1. A drive unit configured to be mounted on a marine vessel, comprising:
    a mobile housing configured to pivot around an axis compared to a hull of the marine vessel;
    a drive shaft configured to rotate in relation to the mobile housing and supported by two rolling bearings; and
    a propulsion element rotating in solidarity with the drive shaft,
    wherein the drive unit comprises, at a front area thereof, at least two braking and locking systems for braking and locking the drive shaft located in an area not watertight between an upstream rolling bearing of the two rolling bearings and the propulsion element.

2. The drive unit according to claim 1, in which each of the at least two braking and locking systems includes an actuator configured to control friction of a lining of a brake pad on a disc brake rotating in solidarity with the drive shaft in case of at least one of braking or locking of the drive shaft.

3. The drive unit according to claim 2, wherein in case of at least one of braking or locking of the drive shaft, the lining comes in radial support on a cylindrical outer surface of the disc brake.

4. The drive unit according to claim 2, wherein in a rest position, the brake pad is moved away radially from the disc brake by a spacing component.

5. The drive unit according to claim 2, wherein the actuator includes a worm screw system rotated by a motor drive to provide a linear motion of translation to an actuator arm provided with a braking component in contact with the brake pad.

6. The drive unit according to claim 5, wherein an inner surface of the braking component and an outer surface of the brake pad are respectively inclined to an axis of the actuator arm.

7. The drive unit according claim 1, wherein the at least two braking and locking systems are identical and arranged symmetrically from the drive shaft.

8. The drive unit according to claim 1, including at least three braking and locking systems located more than 120° from each other around the drive shaft.

9. The drive unit according to claim 1, wherein the propulsion element is mounted on one end located on the front area of the drive unit in relation to the marine vessel and upstream of the upstream roller bearing located at the front area of the drive unit and upstream of the at least two braking and locking systems of the drive shaft.

10. The drive unit according to claim 1, wherein the propulsion element is a propeller or a pump rotor under nozzle.

* * * * *